Figure 1:
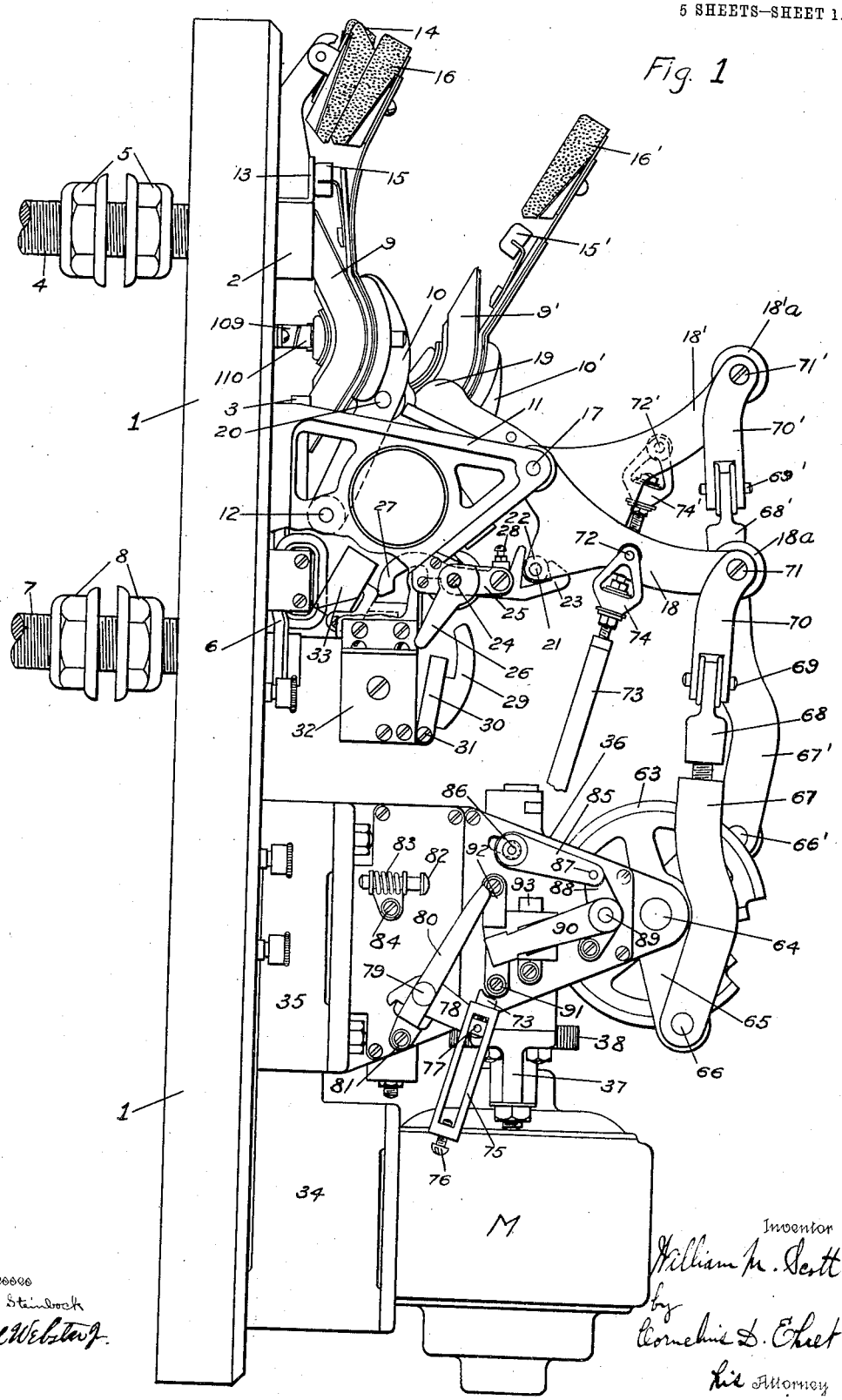

W. M. SCOTT.
ELECTRICAL CONTROL APPARATUS.
APPLICATION FILED JAN. 6, 1910.

993,417.

Patented May 30, 1911.
5 SHEETS—SHEET 1.

W. M. SCOTT.
ELECTRICAL CONTROL APPARATUS.
APPLICATION FILED JAN. 6, 1910.

993,417.

Patented May 30, 1911.

5 SHEETS—SHEET 2.

Witnesses
Anna E. Steinbach
Daniel Webster, Jr.

Inventor
William M. Scott
by Cornelius D. Ehret
his Attorney

W. M. SCOTT.
ELECTRICAL CONTROL APPARATUS.
APPLICATION FILED JAN. 6, 1910.

993,417.

Patented May 30, 1911.
5 SHEETS—SHEET 5.

Witnesses
Anna E. Steinbock
Daniel Webster, Jr.

Inventor
William M. Scott
by Cornelius D. Ehret
his Attorney

UNITED STATES PATENT OFFICE.

WILLIAM M. SCOTT, OF PHILADELPHIA, PENNSYLVANIA, ASSIGNOR TO THE CUTTER ELECTRICAL AND MANUFACTURING COMPANY, A CORPORATION OF NEW JERSEY.

ELECTRICAL CONTROL APPARATUS.

993,417.

Specification of Letters Patent. Patented May 30, 1911.

Application filed January 6, 1910. Serial No. 536,718.

*To all whom it may concern:*

Be it known that I, WILLIAM M. SCOTT, a citizen of the United States, residing at Philadelphia, in the county of Philadelphia and State of Pennsylvania, have invented a new and useful Electrical Control Apparatus, of which the following is a specification.

My invention relates to electrical control apparatus, and particularly to apparatus for controlling heavy electric currents such as used in electric lighting and electric power practice.

My invention resides in electrical control apparatus comprising two or more electric switches or automatic circuit breakers which are operated alternately or in a certain order of succession, means being provided for insuring that a switch or circuit breaker is tripped or is opened before another is closed.

By preference, the switches or circuit breakers are moved to their circuit closing positions by an electric motor, suitable gearing intervening for driving purposes, and suitable mechanism being provided for making and breaking mechanical connection between the switches or circuit breakers and the motor; and it is a further feature of my invention that the mechanisms of the different switches or circuit breakers for making and breaking mechanical connection with the motor are so interrelated, either electrically or mechanically, or both, that only the mechanical connection making mechanism of that switch or breaker which is to be closed can be thrown into operation.

My invention relates to a plurality of switches or circuit breakers operated by and under the control of a single motor, the arrangement being such that only one of the switches or breakers may be closed at a time. The arrangements are such that both electrical and mechanical interlocking is secured, and the arrangement is consequently effective either when the switches or breakers are operated by hand or by the motor.

In another aspect my invention resides in a transfer switch, wherein a consumption circuit may be placed alternately in communication with different supply circuits, or, vice versa, a supply circuit may be put in communication alternately with different consumption circuits, the electrical and mechanical interlocking being such that the alternate operation of the switches or breakers is absolutely determined.

My invention resides also in circuit arrangements and connections for controlling the apparatus such as above described.

My invention resides also in other features hereinafter described and claimed.

Figure 2:
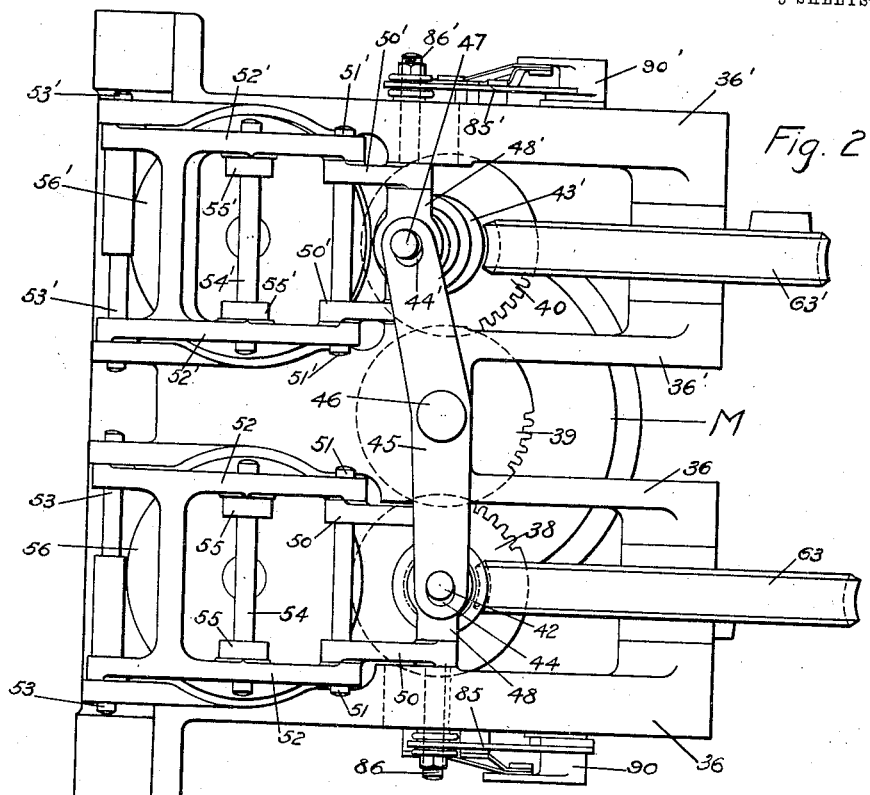
Figure 3:
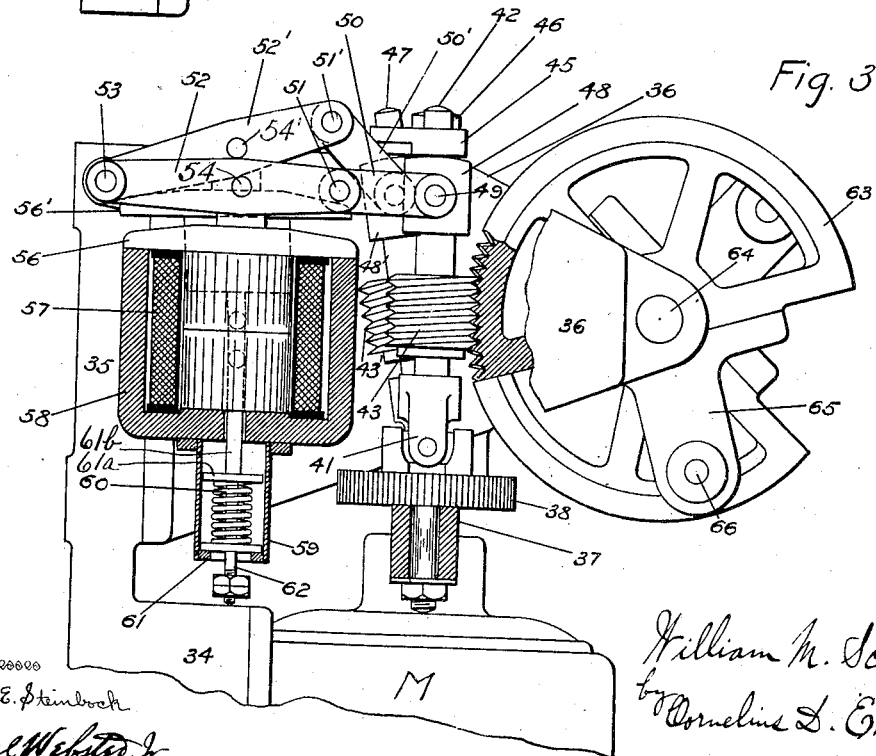
Figure 4:
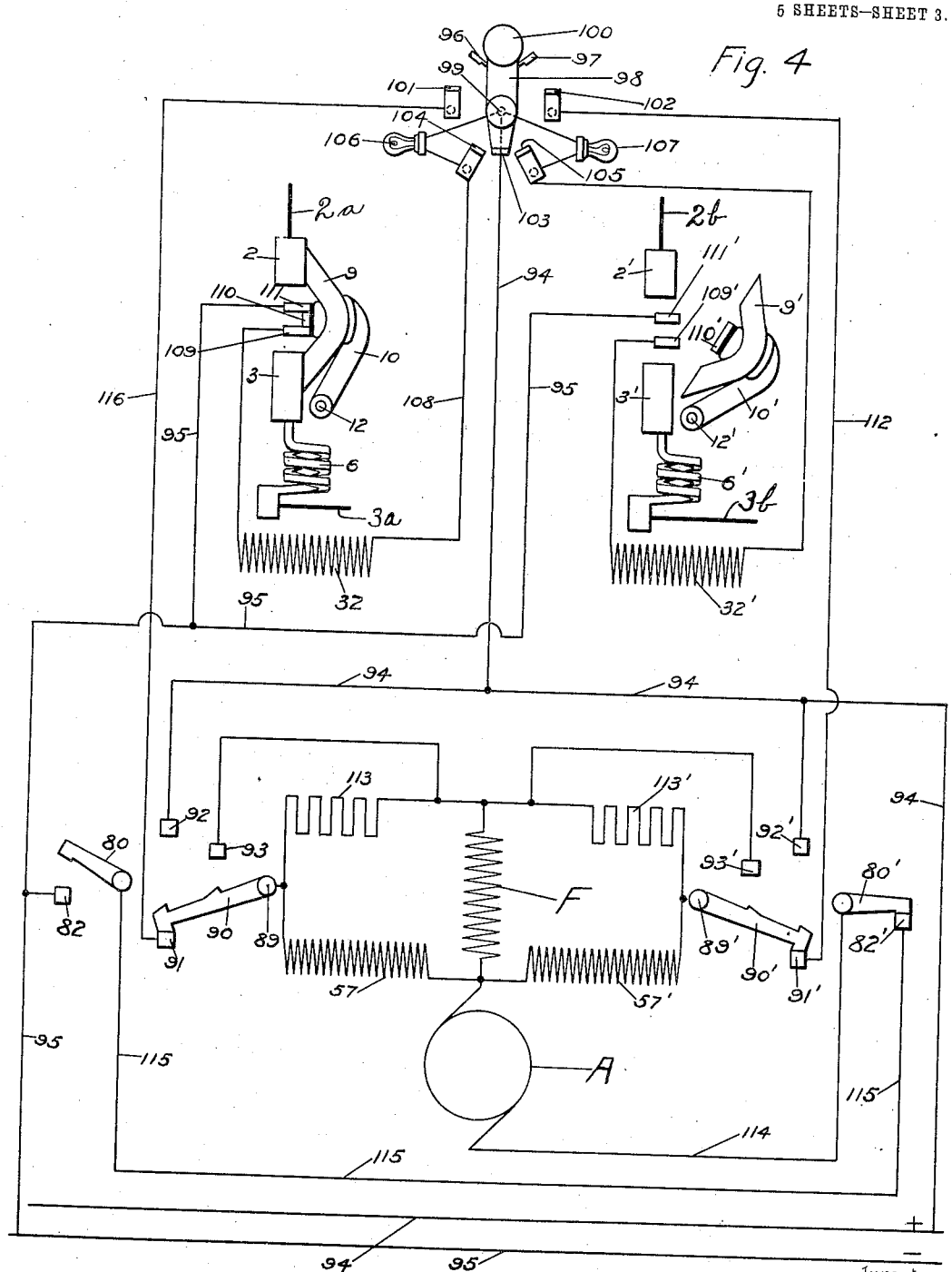
Figure 5:
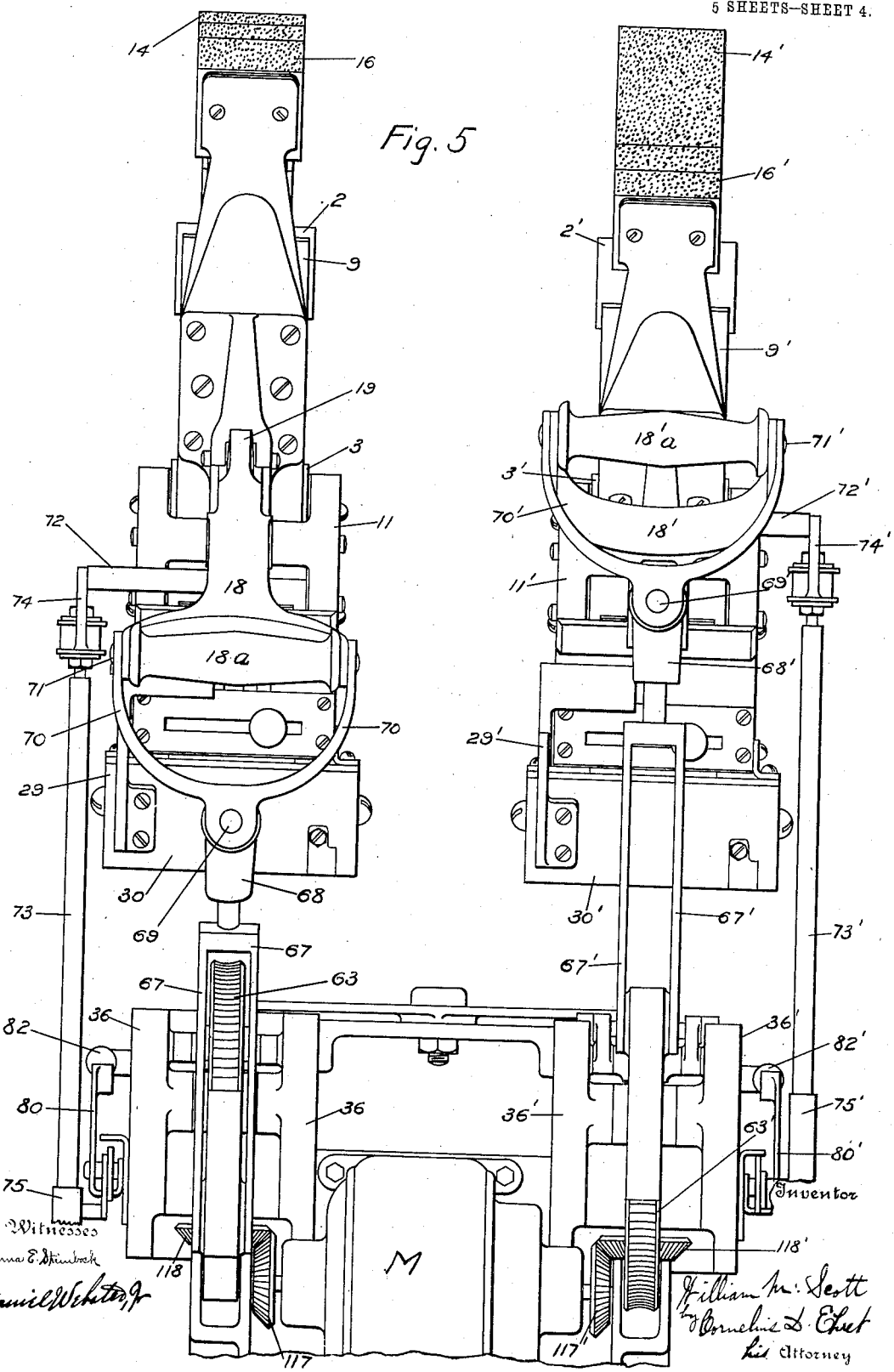
Figure 6:
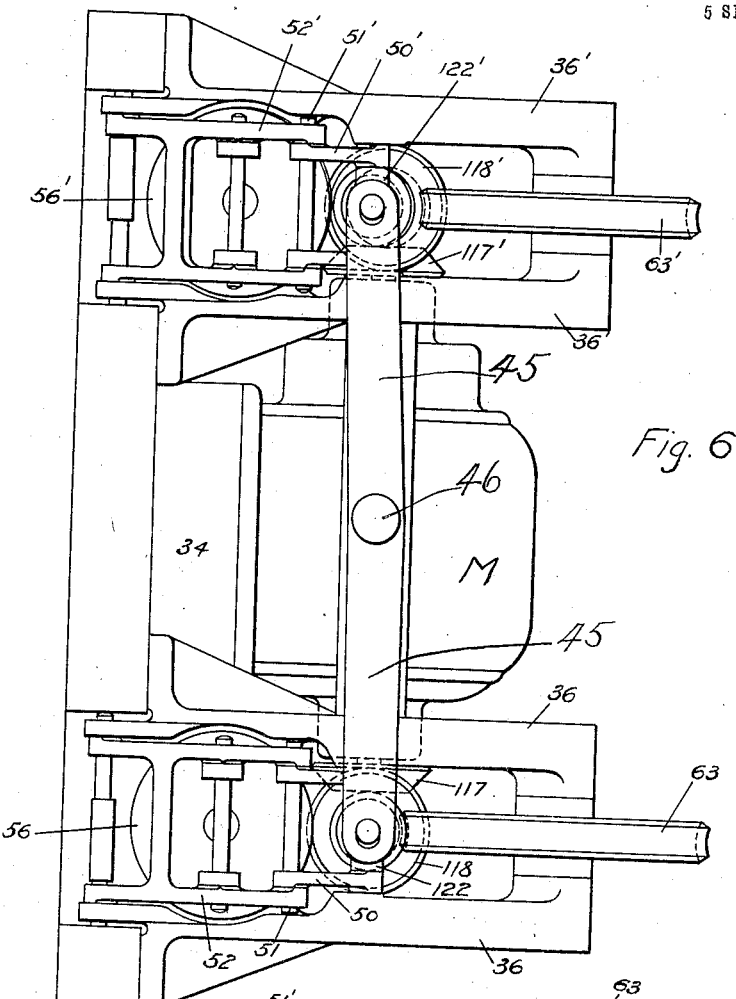
Figure 7:
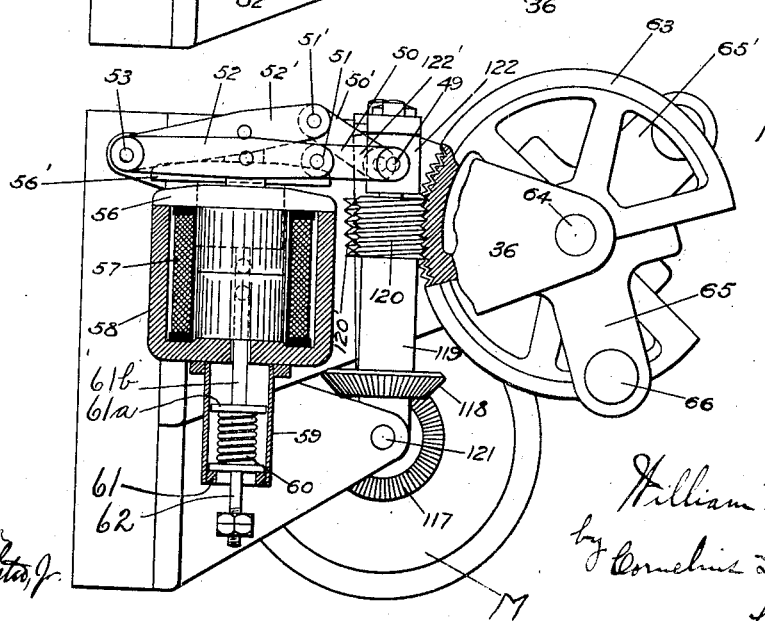

For an illustration of some of the many forms my invention may take, reference is to be had to the accompanying drawings, in which:

Figure 1 is a side elevational view of two switches or circuit breakers and their operating mechanism. Fig. 2 is a top plan view of the driving mechanism. Fig. 3 is a side elevational view of the parts shown in Fig. 2, some parts being shown in section. Fig. 4 is a diagrammatic view of one arrangement my invention may take as to the circuits and connections of the control apparatus. Fig. 5 is a front elevational view of two switches or breakers and their operating mechanism of modified form. Fig. 6 is a top plan view of the motor and driving mechanism shown in Fig. 5. Fig. 7 is a side elevational view of the apparatus shown in Fig. 6, some parts being shown in section.

Referring to Fig. 1, a suitable base 1, preferably of insulating material, such as marble or slate, and as, for example, a panel of a switchboard, has secured upon its front face two switches or automatic circuit breakers. Each switch or circuit breaker comprises main terminal blocks 2 and 3 secured upon the front face of the base 1, the upper terminal by a stud 4 which serves also for electrical connection to a bus bar or other conductor by means of the nuts 5. The lower terminal 3 communicates with the usual overload tripping coil 6 whose other terminal communicates with the stud 7 forming the other terminal of the switch or breaker, nuts 8 being provided for electrical connections to the stud 7 as by bus bar or other suitable conductor.

Adapted to engage and bridge the main terminals 2 and 3 is the laminated bridging member 9 supported upon the arm 10 pivoted to the bracket or housing 11 at 12. The usual intermediate stationary metallic shunt contact 13 and the stationary carbon shunt contact 14 are provided and with them are adapted to engage, respectively, the movable metallic shunt contact 15 and the movable carbon shunt contact 16, contacts 15 and 16 being supported by the arm 10.

Pivoted at 17 in the bracket or housing 11 is the operating handle 18 which extends inwardly toward the base beyond the pivot 17 and has formed at its inner end the cam surface 19 adapted to engage a roller carried by the arm 10 and pivoted thereon at 20. Pivoted at 21 upon the operating lever or arm 18 is a latch roller 22 engaged by the hook latch 23 to lock the switch or breaker in circuit closing position. The latch 23 is pivoted to the frame or housing 11 at 24 as is also the latch actuating member 25 having the tails 26 and 27. The latch actuator 25 carries the adjustable screw 28 adapted to engage upon the top of the latch 23 to actuate the same. The tail 26 extends into the path of travel of the member 29 carried by the armature 30 pivoted at 31 and coöperating with the electromagnet 32. And the tail 27 of the latch actuator 25 extends into the path of travel of the armature 33 coöperating with the overload tripping coil 6.

For closing the two switches or circuit breakers there are provided below them, mounted upon the board or base 1, an electric motor and apparatus driven and controlled thereby. In the arrangement shown in Figs. 1, 2 and 3, the electric motor M is mounted with its shaft vertical and the motor is supported upon the sub-base 34 secured in turn upon the base 1. And upon the sub-base 35 also mounted upon the base 1 are secured the brackets or housings 36 and 36'. Extending across the under sides of the brackets or housings 36 and 36' is a member 37 forming or carrying step bearings for the three spur gears 38, 39 and 40, the gear 39 being secured upon the shaft of the motor M and meshing with both gears 38 and 40 whose spindles or shafts are also vertical. Connected to the shaft or spindle of the gear 38 by universal joint 41 is the shaft or spindle 42 upon which is secured the worm 43, the upper end of the shaft 42 passing through the slightly elongated opening 44 in the rocking arm or member 45 pivoted at 46 upon the housings or stationary part of the apparatus. Similarly, the shaft or spindle 47 is secured by universal joint to the shaft or spindle of the gear 40 and extends through the slightly elongated opening 44' in the other end of the member 45. The shaft 47 also carries a worm 43'. Just below the member 45 on the shaft or spindle 42 is a loose collar 48 to which is pivoted at 49 one end of a link 50 pivoted at 51 to a second link 52 which is, in turn, pivoted to the housing or base at 53. The links 50 and 52 constitute a toggle. To the pin 54 carried by the link 52 is pivoted one end of a vertically extending ear 55 upon the armature member 56 of an electromagnet whose winding is 57 having the magnetic jacket 58. Secured to the jacket 58 is a downwardly extending cylinder member 59 within which is disposed a spiral spring 60, abutting at its lower end against a plate supported by the head 61 secured to the cylinder 59 and pressing with its upper end against the plate 61$^a$ secured to the rod or pin 61$^b$ having a yielding connection with the armature member 56, the spring 60 being in compression and thus normally tending to raise the armature member 56 to collapse the toggle 50, 52. In the other switch or circuit breaker of the pair and its operating mechanism the same reference characters, with the addition of prime marks, indicate like parts to those above described. The worm 43, under the control of the electromagnet whose winding is 57, is adapted to mesh with and drive the worm wheel 63, pivoted in the bracket or housing 36 at 64. The wheel 63 carries a crank 65 to which is pivoted at 66 the connecting rod 67 terminating in an adjustable head 68 pivoted at 69 to the link 70 pivoted at 71 to the outer end of the operating lever 18 at the axis of the hand grip 18$^a$. And for operating the other switch or breaker, the worm 43' is adapted to engage the worm wheel 63' which is connected by similar parts to the operating lever 18' of the other switch or breaker.

Pivoted at 72 to the arm 18 is the rod 73 secured to and longitudinally adjustable with respect to the head 74. In Fig. 1 the rod 73 is shown broken away for the sake of clearness. At its lower end it is provided with a longitudinally slotted head 75 carrying an adjusting screw 76 for determining the amount of travel the member 77 may have in the slot. The member 77 is pivoted to the crank 78 and the latter is pivoted at 79 to a fixed part of the apparatus, such crank 78 controlling the winding mechanism and the latch of a snap switch (such, for example, as illustrated in my application Serial Number 464,732) whose movable blade 80 is also pivoted at 79, a binding post 81 serving for electrical communication with the snap switch blade 80. This blade 80 is adapted to engage the yielding contact 82 mounted upon a fixed portion of the apparatus and forced outwardly by the spring 83. The binding post 84 serves for electrical communication with the contact 82.

As seen in Fig. 1, a crank 85 is pivoted upon the pin 86 extending through a slot in the housing 36 and connected to the pin 49, shown in Figs. 2 and 3, at the outer end of the toggle link 50. This pin 86, therefore, has a movement to right and left, as viewed in Fig. 1, with the worm shaft, being operated simultaneously therewith by the toggle 50, 52. At its outer end the crank 85 is pivoted at 87 to the crank 88 pivoted to the housing at 89 and carrying the movable contact lever 90 of a switch. By the movement of the pin 86 to the right or left, the switch member 90 is moved upon its pivot 89. In the position shown in Fig. 1, the switch blade 90 is in engagement with contact 91. In its other position it engages contacts 92 and 93.

Referring to Fig. 4, showing diagrammatically the two switches or breakers and the operating and control apparatus and circuits, conductors 94 and 95 represent the conductors which extend to any suitable source of current. The conductor 94 communicates directly with the contacts 96 and 97 carried by the switch arm 98 pivoted at 99 and having the operator's handle 100. The contact 96 is adapted to engage contact 101 and contact 97 is adapted to engage contact 102, the switch lever 98, when released, being brought back to central or normal position by gravity or spring control. At its lower end the switch lever 98 carries the contact 103 adapted to engage either of contacts 104 and 105. Between contact 104 and the switch lever 98 is connected the incandescent indicating lamp 106; and between the contact 105 and the switch blade 98 is connected the electric incandescent indicating lamp 107. The switch having the contacts 96 and 97 and the other contacts and lamps as described, may be located at a remote point, and thus remotely control the switches or circuit breakers and their operating mechanism; or such switch may be located near at hand.

There is a circuit completed through lamp 106 from conductor 94 through contact 104, conductor 108, tripping coil 32, stationary contact 109, bridging contact 110, stationary contact 111 to conductor 95 causing the lamp 106 to glow. The contacts 109 and 111 are disposed upon the base 1 between the upper and lower main contacts 2 and 3. The bridging contact 110 is carried by but insulated from the movable contact member 9. And, similarly, when the right hand breaker or switch shown in Fig. 4, is closed there is a circuit from conductor 94 through lamp 107 through tripping coil 32', contact 109', bridging contact 110', contact 111' to conductor 95. When one of these lamps is burning or glows the operator knows that the switch or circuit breaker corresponding with the glowing lamp is in circuit closing position, and the other lamp being dark, he knows that the other breaker or switch is open, which it must be due to the nature of the control and control apparatus.

The operation is as follows: The left hand switch or breaker, as viewed in Fig. 4, being in circuit closing position, and the right hand switch or breaker being in open position, the operator at the switch 98 knows by the glowing of lamp 106 which switch or breaker is closed and which is open. When it is desired to open the left hand switch or breaker and close the right hand switch or breaker, the operator grasps handle 100 and rotates the switch arm or lever 98 in a clockwise direction about its pivot 99, first bringing contacts 103 and 104 into engagement with each other. This short circuits the lamp 106 and the increased current then flowing through tripping coil 32 is sufficient to trip the left hand switch or breaker and it flys to open position, the final break coming at the shunt carbons as well understood in the art. As the left hand breaker of Fig. 4, being the front breaker shown in Fig. 1, opens, its operating handle 18 rotates in a counter-clockwise direction about its pivot 17, as viewed in Fig. 1. This raises connecting rods 67 and 73. The upward movement of rod 73 causes the screw 76 carried at its lower end to engage the member 77 to rotate the crank or lever 78 and thus bring contact 80 into engagement with contact 82 which controls the operating motor M. As the operator continues the rotation of switch lever 98, contact 97 engages contact 102, allowing current to flow from conductor 94 through contacts 97 and 102, thence through conductor 112 to contact 91' of the right hand switch or breaker mechanism, through the switch blade 90', through the resistance 113', thence through the series field winding F of the motor M, thence through the armature A of the motor M, through conductor 114 through switch blade 80', contact 82', thence by conductor 115 to switch blade 80 (which, due to the opening of the left hand switch or breaker, is in engagement with contact 82 as above described) through contact 82 to conductor 95. And current flows also through winding 57' in parallel with the resistance 113' and the field winding F. The winding 57' being thus traversed by current causes the armature 56' of the right hand switch or breaker to be attracted downwardly (see Fig. 3) causing the toggle 50', 52', to move the worm 43' into mesh with the worm wheel 63'. Simultaneously, the motor M starts to rotate, always in the same direction, and drives the worm wheel 63' through the worm 43', gear 40 and gear 39. This causes the downward movement of the connecting rod 67' which causes the clockwise rotation of the operating arm 18' of the right hand breaker causing the same to be moved to circuit closing position where it is locked by its latch corresponding with latch 23. And as the toggle 50', 52' is extended it causes the movement of the switch lever 90' away from contact 91' and into engagement with contacts 92' and 93' through the agency of cranks corresponding with cranks 85 and 88. When the switch arm 90' has engaged contacts 92' and 93' the resistance 113' is short circuited giving the motor M more power. And the engagement of the contact 90' with contact 92' transfers the motor as to its supply directly to the conductor 94 instead of indirectly through the switch 98. The effect, then, is to rob the switch 98 of control after the closing movement has once begun. In other words, if the operator at switch 98 brings contact 97 into engagement with contact 102, and immediately separates them again, the right hand breaker will, nevertheless, be closed. When the right hand breaker reaches full circuit closing position, its rod 73' pushes downwardly upon the member 77 of its snap switch rotating its crank 78 and unlatching the snap switch, allowing the switch blade 80' to snap away from contact 82', breaking the motor circuit and deënergizing winding 57', allowing the spring corresponding with spring 60 of Fig. 3 to knee or collapse the toggle 50', 52', to move the worm 43' away from the worm wheel 63' thus disconnecting the circuit breaker operating mechanism from the motor M. Simultaneously, however, the pin corresponding with pin 86 of Fig. 1 moves back again thus causing the contact lever 90' to again engage contact 91'. And, similarly, when the left hand breaker, as viewed in Fig. 4, is open and the right hand breaker is closed, the operator moves lever 80 in a counter-clockwise direction first bringing contacts 103 and 105 into engagement thus short circuiting lamp 107 and allowing increased current to flow through the tripping winding 32' to trip the right hand breaker or switch. This breaker in opening raises its rod 73' with the result that its switch arm 80' engages contact 82' in the circuit of the motor M. As the operator continues his movement he brings contacts 96 and 101 into engagement with each other, thus allowing current to flow from conductor 94 through contacts 96 and 101 thence through conductor 116 to contact 91 thence through contact 90 through the resistance 113 and the field winding F and the motor armature A through switch lever 80' and contact 82' through conductor 115 and through switch arm 80 and contact 82 (these latter being in engagement with each other when the left hand breaker is open) to conductor 95. Current also flows through the electromagnet winding 57. The motor is then simultaneously started and the worm 43 brought into engagement with worm wheel 63, the motor then pulling downwardly on the rod 67 causing the left hand breaker to be closed and locked by its latch 23. When it reaches circuit closing position, the rod 73 has pushed downwardly upon the member 77 to actuate the crank 78 and unlatch the snap switch whose blade 80 then separates from contact 82 to break the motor circuit and also to deënergize the winding 57 whereupon the spring 60 knees or collapses the toggle 50, 52, and moves the worm 43 out of mesh from the worm wheel 63.

It will be noted that since the worm shafts 42 and 47 extend through slotted openings in the rocker bar 45, when one toggle is extended to move its associated worm into engagement with the associated worm wheel the other worm is and must be positively carried away from its associated worm wheel. Thus, it is mechanically impossible to drive both worm wheels simultaneously from the motor. They must be alternately driven and therefore the circuit breakers or switches can not be simultaneously closed, but must be alternately closed.

The bridging contact 9 of the left hand switch or breaker, as viewed in Fig. 4, may be a part of or control the same circuit or a different circuit from that controlled by the bridging member 9' of the right hand breaker or switch. For example, the lower terminals 3 and 3' of the two switches or breakers may connect with the same conductor of a consumption circuit, while the upper terminals 2 and 2' may connect each with a conductor of a different circuit, such as different supply circuits. Thus, when the left hand breaker is closed the energy consumed by the apparatus such as motors, lighting circuits, etc., is supplied from one supply circuit through the left hand breaker or switch. But upon opening the left hand breaker or switch and closing the right hand one, by the apparatus above described, the energy is derived from a different supply circuit. It will, therefore, be understood that by the apparatus shown and described, as to one of its many uses, will prevent a consumption circuit from being simultaneously in communication with two supply circuits. In other words, the apparatus insures that when communication with one supply circuit is closed, the communication with the other supply circuit is positively interrupted.

While in Fig. 4 only two single pole switches are shown it is to be understood that a pair as shown in Fig. 4 may be used to control communication with one conductor of a consumption circuit, while another similar pair may be used to control communication with another conductor of that consumption circuit.

While in Figs. 1, 2 and 3 I have shown one form of the switch or breaker operating mechanism, it is to be understood that my invention embraces many other forms and is not limited to the specific forms illustrated.

The arrangement as shown in Fig. 1 with the motor shafts vertical is advantageous where room laterally on the switchboard or base must be economized. Where such economy of space is not necessary, however, the motor may be mounted with its shaft horizontal as shown in Figs. 5, 6 and 7. Here the parts are the same as in the figures heretofore described, except that the shaft of the motor M carries at its ends the bevel gears 117 and 117' meshing respectively with the bevel gears 118 and 118'. The bevel gears 118 and 118' are secured respectively upon the vertically extending sleeves or collars 119 and 119' which carry at their upper ends the worms 120 and 120'. The sleeves or collars 119 are rotatable upon vertical shafts movable about a horizontal pivot 121, the upper end of the shafts being provided with heads 122 and 122' pivoted respectively to the toggle links 50 and 50'. The pivot 121 being concentric with the motor shaft or gears 117 and 117', when the toggles extend or collapse, the worms are brought into or from engagement with the associated worm wheels 63 and 63', the rotation taking place about the pivot 121. Otherwise the apparatus is the same as illustrated in Figs. 1, 2 and 3.

What I claim is:

1. In combination, a plurality of switches or circuit breakers, a motor for operating the same, means for mechanically connecting and disconnecting said motor and each switch or circuit breaker, and mechanical means controlling said connecting and disconnecting means for insuring that a part only of said switches or circuit breakers shall be operated by said motor at a given time.

2. In combination, a plurality of switches or circuit breakers, a motor for operating the same, means for mechanically connecting and disconnecting said motor and each switch or circuit breaker, and means mechanically interconnecting said connecting and disconnecting means, whereby when a switch or circuit breaker is operated by said motor another switch or circuit breaker is insured against operation by said motor.

3. In combination, a plurality of switches or circuit breakers, a motor for operating the same, disengageable mechanical connections for connecting each of said switches or circuit breakers with said motor, and mechanical means for preventing simultaneous connection between all of said switches or circuit breakers and said motor.

4. In combination, a plurality of switches or circuit breakers, a motor, gearing intervening between said motor and each of said switches or breakers, motor connecting and disconnecting means for each switch or breaker, and a mechanical connection between said motor connecting and disconnecting means of the switches or breakers for insuring less than all the switches or breakers being operated by said motor.

5. In combination, a plurality of switches or circuit breakers, a motor, means intervening between said motor and each of said switches or breakers for connecting and disconnecting the same with and from said motor, mechanical means interconnecting said means of the different switches or breakers, whereby when one of said means is operative another is inoperative, and electro-responsive means for each switch or breaker for controlling said mechanical interconnecting means.

6. In combination, a plurality of switches or circuit breakers, a motor, a worm and gear intervening between said motor and each of said switches or breakers, the worms being movable into and out of engagement with their associated gears, a member connecting the worms of the different switches or breakers insuring their alternate operation, and means for operating the worm of each switch or breaker.

7. In combination, a plurality of switches or circuit breakers, a motor, means intervening between said motor and each of said switches or breakers for connecting and disconnecting the same with and from said motor, a pivoted lever connected to said means for insuring their alternate operation, and electro-responsive means for actuating said lever.

8. In combination, a plurality of switches or circuit breakers, a motor, means intervening between said motor and each of said switches or breakers for connecting and disconnecting the same with and from said motor, mechanical means insuring alternate engagement of said means, electro-magnetic means for controlling each of said means, and a switch for controlling said motor and said electro-magnetic means.

9. In combination, a plurality of switches or circuit breakers, a motor, means intervening between said motor and each of said switches or breakers for connecting and disconnecting the same with and from said motor, a member for insuring alternate engagement of said means, electro-magnetic means for controlling each of said means, a tripping coil for each switch or breaker, and a switch controlling said tripping coil, said electro-magnetic controlling means, and said motor.

10. In combination, a plurality of switches or circuit breakers, tripping coils therefor, a motor, a connecting and disconnecting means between said motor and each of said switches or breakers, mechanical means insuring the alternate operation of said means, electro-magnetic means controlling each of said connecting and disconnecting means, and a switch for first controlling said tripping coils and thereafter controlling said motor and said electro-magnetic means.

11. In combination, a plurality of switches or circuit breakers, a motor, connecting and disconnecting means intervening between said motor and each of said switches or breakers, mechanical means for insuring the alternate operation of said means, electro-magnetic means for controlling each of said connecting and disconnecting means, a control switch for controlling said electro-magnetic means and said motor, a switch for oreaking the motor circuit when the corresponding switch or breaker has reached normal position, and a switch for maintaining said motor circuit closed independently of said control switch.

12. In combination, a plurality of switches or circuit breakers, a motor, connecting and disconnecting means intervening between said motor and each of said switches or breakers, a member connecting said means for insuring their alternate operation, and controlling switches and circuits for insuring the opening of a switch or breaker before the closure of another by said motor.

13. In combination, a plurality of main switches, of a motor for operating the same, means for insuring that a part only of said main switches shall be operated by said motor at a given time, a motor switch for each of said main switches, each motor switch being opened when its main switch has been moved to normal position by said motor, the circuit of said motor being closable only when all of said motor switches are closed.

14. In combination, a plurality of main switches, of a motor for operating the same, means for insuring that a part only of said main switches shall be operated by said motor at a given time, a motor switch for each of said main switches, each motor switch being opened when its main switch has been moved to normal position by said motor and each motor switch closed when its main switch has moved to abnormal position, the circuit of said motor being closable only when all of said motor switches are closed.

15. In combination, a plurality of main switches, a motor for operating the same, mechanical means insuring that all of said main switches shall not be simultaneously operated by said motor, an operator's switch for starting said motor, and a switch associated with each of said main switches for maintaining said motor energized after it has been started by said operator's switch.

16. In combination, a plurality of main switches, a motor for operating the same, a trip coil for each main switch, a disengageable mechanical connection between said motor and each of said main switches, an engaging coil for each main switch causing mechanical connection between said main switch and said motor, and an operator's switch for first energizing a trip coil of one main switch and then energizing said engaging coil of another main switch.

17. In combination, a plurality of main switches, a motor for operating the same, a disengageable connection for each main switch for connecting and disconnecting the same with and from said motor, mechanical means for insuring that a part only of said disengageable connections shall be simultaneously operated, a trip coil for each main switch, an engaging coil for each main switch controlling its disengageable connection, and an operator's switch for first energizing the trip coil of a main switch and thereafter energizing the engaging coil of another main switch.

18. In combination, a plurality of switches or circuit breakers, a motor, means intervening between said motor and each of said switches or circuit breakers for connecting and disconnecting the same with and from said motor, and a lever connected to said means for insuring their alternate operation.

19. In combination, a plurality of switches or circuit breakers, a motor for operating the same, means for mechanically connecting and disconnecting said motor and each switch or circuit breaker, an engaging coil for each switch or circuit breaker for actuating said mechanical connecting and disconnecting means, and means independent of said engaging coils and their circuits controlling said connecting and disconnecting means for insuring that a part only of said switches or circuit breakers shall be operated by said motor at a given time.

20. In combination, a plurality of switches or circuit breakers, a motor for operating the same, means for mechanically connecting and disconnecting said motor and each switch or circuit breaker, means controlling said connecting and disconnecting means for insuring that a part only of said switches or circuit breakers shall be operated by said motor at a given time, and a motor controlling switch for each of said switches or circuit breakers.

21. In combination, a plurality of switches or circuit breakers, a motor, a worm and gear intervening between said motor and each of said switches or circuit breakers, the worms being movable into and out of engagement with their associated gears, and a member connecting the worms of the different switches or circuit breakers insuring their alternate operation.

22. In combination, a plurality of switches or circuit breakers, a motor, a worm and gear intervening between said motor and each of said switches or breakers, a toggle for each worm to move the same into and out of engagement with its associated gear, and a member connecting the worms of the different switches or circuit breakers insuring their alternate operation.

23. In combination, a plurality of switches or circuit breakers, a motor, a worm and gear intervening between said motor and each of said switches or breakers, a toggle for each worm to move the same into and out of engagement with its associated gear, a member connecting the worms of the different switches or circuit breakers insuring their alternate operation, and electro-magnetic means controlling said toggles.

24. In combination, a plurality of main switches, a motor, a worm and gear intervening between said motor and each of said switches, means actuating each worm to move the same into and out of engagement with its associated gear, a member connecting the worms of the different main switches insuring their alternate operation, an operator's switch controlling said motor and said worm actuating means, and a switch controlled by said worm actuating means for maintaining said motor energized independently of said operator's switch.

25. In combination, a plurality of switches or circuit breakers, a motor, a worm and gear for each switch or circuit breaker, a shaft for each worm, a driving shaft for each worm shaft, a universal joint between each driving shaft and its worm shaft, and a member connecting the worms of the different switches or breakers insuring their alternate operation.

26. In combination, a main switch, an operating member therefor, means restraining said main switch in normal position, electro-responsive means for tripping said main switch, a motor for actuating said operating member, a disengageable mechanical connection between said motor and said operating member, an auxiliary switch controlling the circuit of said motor, an operating member for said auxiliary switch, and a member connected to the operating member of said main switch or breaker and having lost motion connection with the operating member of said auxiliary switch, said main switch operating member and said member connected thereto moving independently of said motor when said main switch is tripped.

27. In combination, a plurality of switches or circuit breakers, a motor, a bevel gear for each switch or circuit breaker driven by said motor, a pivoted shaft for said bevel gear, a worm on said shaft, and a member connecting the worms of the different switches or circuit breakers insuring their alternate operation.

28. In combination, a plurality of switches or circuit breakers, a motor for actuating the same, a bevel gear for each switch or circuit breaker driven by said motor, a pivoted shaft for said bevel gear, a worm on each shaft, a second bevel gear for driving each of said bevel gears, said pivoted shaft being swingable about the center of said second bevel gear.

29. In combination, a plurality of switches or circuit breakers, a motor for actuating the same, a bevel gear for each switch or circuit breaker driven by said motor, a pivoted shaft for said bevel gear, a worm on each shaft, a second bevel gear for driving each of said bevel gears, said pivoted shaft being swingable about the center of said second bevel gear, and a member connecting the worms of the different switches or circuit breakers insuring their alternate operation.

30. In combination, a plurality of switches or circuit breakers, a motor for operating the same, means for mechanically connecting and disconnecting said motor and each switch or circuit breaker, means controlling said connecting and disconnecting means for insuring that a part only of said switches or circuit breakers shall be operated by said motor at a given time, an engaging coil for actuating each of said connecting and disconnecting means, a motor control switch for each of said switches or circuit breakers, an operator's switch controlling said motor through said motor control switches, and a switch for each switch or circuit breaker actuated by its engaging coil for maintaining said motor energized after initial energization by said operator's switch.

31. In combination, a plurality of switches or circuit breakers, a motor for operating the same, disengageable connecting means for connecting said motor with each of said switches or breakers, an engaging coil for actuating each of said disengageable means, an operator's switch controlling said motor, and a second control switch for each of said switches or breakers actuated by its engaging coil, a resistance for each of said switches or breakers in series with said motor, said second control switch when actuated short circuiting said resistance and maintaining said motor energized independently of said operator's switch.

32. In combination, a plurality of main switches or breakers, a motor for operating the same, a trip coil for each main switch or breaker, a motor control switch for each main switch or breaker, an operator's switch for controlling said motor through said motor control switches and for energizing said trip coils, the motor switch of a main switch or breaker being closed after its tripping coil has been energized.

33. In combination, a plurality of switches or circuit breakers, a motor rotating always in one direction for operating the same, means for mechanically connecting and disconnecting said motor and each switch or circuit breaker, means controlling said connecting and disconnecting means for insuring that a part only of said switches or circuit breakers shall be operated by said motor at a given time, a latch for restraining each of said switches or circuit breakers in normal position, and means for tripping each of said switches or circuit breakers, the opening of each switch or circuit breaker being independent of either actuation or control by said motor.

In testimony whereof I have hereunto affixed my signature in the presence of the two subscribing witnesses.

WILLIAM M. SCOTT.

Witnesses:
ELEANOR T. MCCALL,
ANNA E. STEINBOCK.